(No Model.)

E. F. PFLUEGER.
ARTIFICIAL FISH BAIT.

No. 564,839. Patented July 28, 1896.

WITNESSES
Geo. M. Anderson
Philip C. Masi.

INVENTOR
E. F. Pflueger
by E. W. Anderson
his Attorney

UNITED STATES PATENT OFFICE.

ERNEST F. PFLUEGER, OF AKRON, OHIO.

ARTIFICIAL FISH-BAIT.

SPECIFICATION forming part of Letters Patent No. 564,839, dated July 28, 1896.

Application filed May 9, 1895. Serial No. 548,716. (No model.)

*To all whom it may concern:*

Be it known that I, ERNEST F. PFLUEGER, a citizen of the United States, and a resident of Akron, in the county of Summit and State of Ohio, have invented certain new and useful Improvements in Artificial Fish-Bait; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
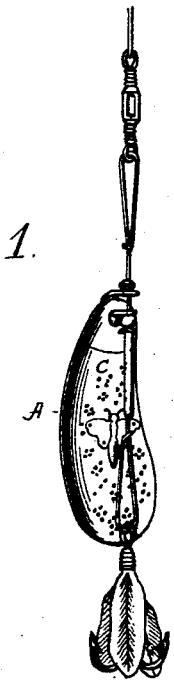
Figure 2:
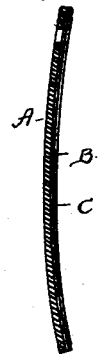

Figure 1 of the drawings is a representation of bait as used, and Fig. 2 is a section through bait.

This invention has relation to certain new and useful improvements in artificial fish-bait, and is more particularly designed as an improvement upon the bait described and claimed in my Patents Nos. 272,317, granted February 13, 1883, and 284,056, granted August 28, 1883, for artificial fish-bait having luminous properties. The difficulty with this kind of bait previous to the present invention has been the liability of the luminous material or paint to "flake" off from the metal or substance of which the body of the bait is composed, and especially has this been the case with bait having any flexibility or bend. The luminous material soon flaked off and rendered the bait worthless.

The present invention consists in a bait of this character which has an exterior or superficial coating or covering of luminous material, which is superimposed upon a layer of a flexible paint or composition applied to the bait-body, such layer forming a base for the superficial coating which is not only tenacious in its adhesion to such coating, but which yields or gives under the flexure of the bait-body.

In the accompanying drawings I have shown the invention applied to a spoon-bait, but it is equally adapted to other forms.

In the drawings, the letter A designates the bait-body; B, the intermediate layer or base of the flexible paint or composition, and C the superficial coating or covering of luminous material or material possessing luminous properties. This layer and coating are exaggerated in the drawings for the purpose of better illustration. A suitable composition for this intermediate layer or base is the following: linseed oil, one gallon; dried white copperas, three ounces; sugar of lead, three ounces; litharge, eight ounces. To this may be added a solution of rubber in varying quantities.

The bait-body is first treated with a layer of such composition, and when this is dry the luminous material is applied. The intermediate layer should be of sufficient thickness to lessen the exterior workings of the same under the flexure of the body portion. The bait so treated is designed to be entirely proof against flaking.

Having thus described my invention, what I claim as new, and desire to secure by Letters Patent, is—

As a new article of manufacture, an artificial fish-bait, comprising a flexible body portion, having thereon a layer or coating of an adhesive flexible paint or composition containing rubber, said layer or coating being of sufficient thickness to lessen its exterior working under flexure, and a superficial coating or covering of luminous material, or material possessing luminous properties, superimposed upon the layer or coating of flexible material, whereby, under flexure of said body, said superficial coating or covering is protected from flaking by the said layer or coating of flexible material, substantially as specified.

In testimony whereof I affix my signature in presence of two witnesses.

ERNEST F. PFLUEGER.

Witnesses:
G. L. A. GALL,
T. W. WAKEMAN.